United States Patent
Noda

(10) Patent No.: US 9,319,146 B2
(45) Date of Patent: Apr. 19, 2016

(54) OPTICAL TRANSMITTER

(75) Inventor: Masaki Noda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 37 days.

(21) Appl. No.: 14/365,790

(22) PCT Filed: Mar. 22, 2012

(86) PCT No.: PCT/JP2012/057403
§ 371 (c)(1),
(2), (4) Date: Jun. 16, 2014

(87) PCT Pub. No.: WO2013/140587
PCT Pub. Date: Sep. 26, 2013

(65) Prior Publication Data
US 2014/0341571 A1  Nov. 20, 2014

(51) Int. Cl.
*H04B 10/079* (2013.01)
*H04B 10/50* (2013.01)
*H04B 10/564* (2013.01)

(52) U.S. Cl.
CPC ........ *H04B 10/564* (2013.01); *H04B 10/07955* (2013.01); *H04B 10/504* (2013.01)

(58) Field of Classification Search
None
See application file for complete search history.

(56) References Cited

U.S. PATENT DOCUMENTS

2006/0164712 A1* 7/2006 Ishibashi ............... H01S 5/0683
359/239

FOREIGN PATENT DOCUMENTS

| JP | 5-67827 | 3/1993 |
|---|---|---|
| JP | 8-162700 | 6/1996 |
| JP | 9-162811 | 6/1997 |
| JP | 10-209538 | 8/1998 |
| JP | 11-112437 | 4/1999 |
| JP | 2006-80677 | 3/2006 |
| JP | 2006-210812 | 8/2006 |

OTHER PUBLICATIONS

International Search Report issued May 22, 2012, in PCT/JP12/057403 filed Mar. 22, 2012.
Office Action issued Dec. 3, 2015 in Chinese Patent Application No. 201280070390.9 (with English Translation).

* cited by examiner

*Primary Examiner* — Darren E Wolf
(74) *Attorney, Agent, or Firm* — Oblon, McClelland, Maier & Neustadt, L.L.P

(57) ABSTRACT

A photodiode converts an optical signal output from a laser diode to a current signal, and a current-to-voltage conversion circuit converts the current signal to a voltage signal. A comparison amplifier compares the voltage signal with a reference voltage to control the current flowing from a variable current source and increases or decreases a bias current for driving the laser diode. The current-to-voltage conversion circuit comprises a resistor and a variable current source that are connected in parallel. Therefore, it is possible to change the bias current without changing the resistance value of the resistor and to avoid limiting the dynamic range of the optical signal that is output. In addition, since the resistance value of the resistor does not change, the loop gain does not change, thereby stabilizing the control operation.

6 Claims, 7 Drawing Sheets

OPTICAL TRANSMITTER

TECHNICAL FIELD

The present disclosure relates to an optical transmitter.

BACKGROUND ART

An optical transmitter is provided at the front end of an optical communication system. The optical transmitter converts electrical signals to optical signals and outputs the result.

Typically, it is preferable for the strength of the optical signal output by the optical transmitter to always be constant regardless of the passage of time or the temperature of the environment, in order to ensure stability in the optical system. In order to automatically control the strength of the optical signal to a constant value, an APC (Automatic Power Control) is widely used in general.

An optical transmitter utilizing an APC is disclosed in Patent Literature 1.

In the optical transmitter of Patent Literature 1, the strength of the optical signal produced by a light-emitting element is detected by an optical detector. The optical detector generates a current signal corresponding to the strength of the optical signal, and this current signal flows to a variable resistor. The variable resistor converts the current signal to a voltage signal and supplies this voltage signal to a controller. The controller compares the voltage signal output by the variable resistor with a reference voltage and, based on this comparison result, sets the resistance value of the variable resistor, a bias current driving the light-emitting element and a current value of a modulated current. That is to say, the optical transmitter of Patent Literature 1 accomplishes a feedback-type APC to cause stability in the strength of the optical signal generated by the light-emitting element.

With the optical transmitter of Patent Literature 1, the conversion gain when converting the current signal to a voltage signal is set by the resistance value of the variable resistor. Furthermore, the resistance value of the variable resistor is controlled based on the temperature inside the optical transmitter, and the conversion gain when converting the current signal to the voltage signal is regulated.

CITATION LIST

Patent Literature

Patent Literature 1: Japanese Patent 2006-80677

SUMMARY OF INVENTION

Technical Problem

With the optical transmitter of Patent Literature 1, the conversion gain when converting the input electrical signal into an optical signal is determined by the resistance value of the variable resistor. That is, the strength of the optical signal is determined by the resistance value of the variable resistor. Furthermore, when the current signal output by the optical detector is large, the resistance value of the variable resistor is regulated to a small value and, conversely, when the current signal is small, the resistance value of the variable resistor is regulated to a large value. By accomplishing such regulation, the strength of the optical signal is regulated. However, the current value output by the optical detector and the resistance value of the variable resistor are inversely proportional, so in the case of an optical transmitter with a high conversion efficiency in the optical detector, the resistance value of the variable resistor becomes smaller. As the resistance value of the variable resistor becomes smaller, changes in optical signals become extremely sensitive to errors in the resistance value of the variable resistor, creating the problem that the adjustable dynamic range of the optical signal is limited.

In addition, with the optical transmitter of Patent Literature 1, conversion gain when converting the electric signal to an optical signal is determined by changing the resistance value of the variable resistor, so loop gain also changes with a dependence on the resistance value of the variable resistor. This creates the problem that the APC becomes unstable as a result of the loop gain changing.

It is an objective of the present disclosure to provide an optical transmitter capable of stable APC operation while also ensuring a wide dynamic range.

Solution to Problem

In order to achieve the above object, the optical transmitter according to the present disclosure is an optical transmitter for outputting an optical signal, the optical transmitter comprising:

a light-emitting element that is driven and produces the optical signal;

a light-receiving element for receiving the optical signal and outputting a current signal indicating the strength of the optical signal received;

a current-to-voltage conversion circuit for converting the current signal output by the light-receiving element to a voltage signal;

a comparator for comparing a reference voltage and the voltage signal output by the current-to-voltage conversion circuit and outputting the comparison result;

a bias current driving circuit for passing a direct current corresponding to the comparison result from the comparator to the light-emitting element to drive the light-emitting element;

a modulated current driving circuit for passing a modulated current the amplitude of which changes in accordance with an input signal to the light-emitting element to modulate the strength of the optical signal; and a temperature sensor for detecting the temperature inside the optical transmitter;

wherein the current-to-voltage conversion circuit comprises a resistor connected to the light-receiving element and a variable current source connected in parallel with the resistor for passing the current signal together with the resistor, with a composition that outputs the voltage signal from the resistor; and comprising regulating means for regulating the amplitude of the modulated current and the current value of the current flowing to the variable current source.

Advantageous Effects of Invention

With the present disclosure, stable APC operation is possible while also ensuring a wide dynamic range.

DESCRIPTION OF EMBODIMENTS

Below, the preferred embodiments of the present disclosure are described in detail with reference to the attached drawings.

First Preferred Embodiment

Figure 1:
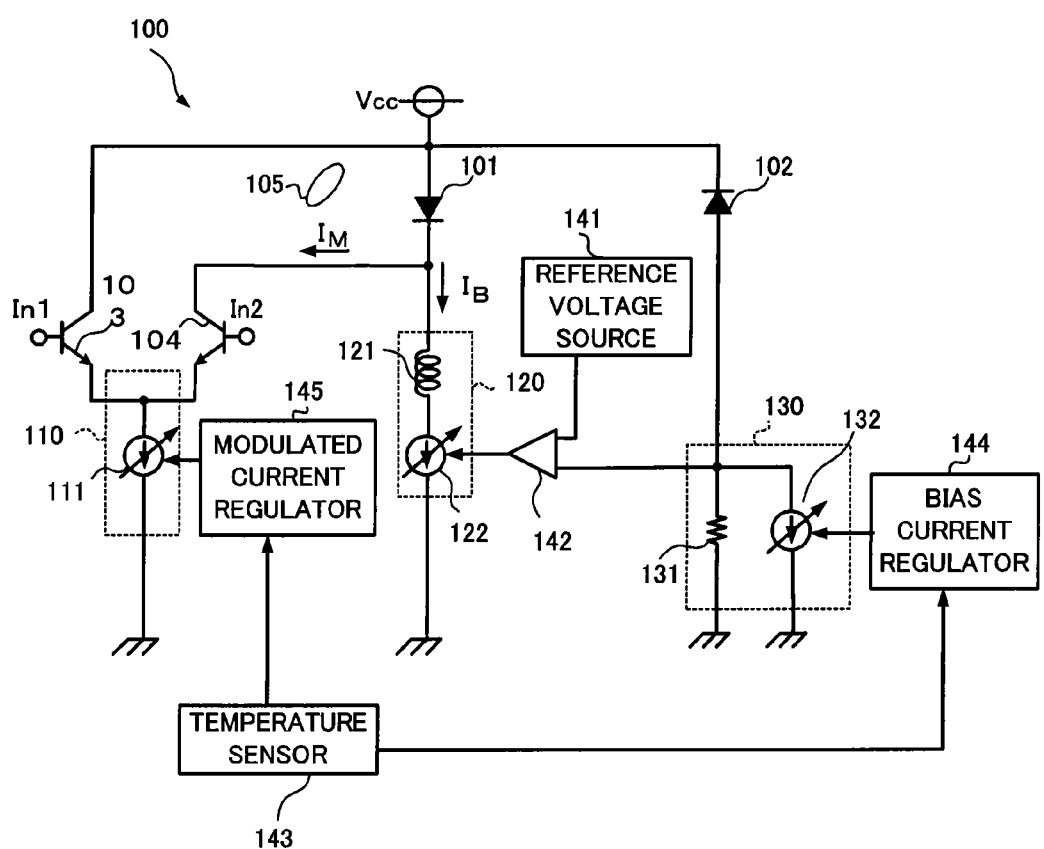
FIG. 1 is a composition diagram showing an optical transmitter according to a first preferred embodiment of the present disclosure.

FIG. 1 is a composition diagram showing an optical transmitter according to a first preferred embodiment of the present disclosure.

The optical transmitter 100 comprises a laser diode 101 as a light-emitting element, a photodiode 102 as a light-receiving element, a transistor 103 the base of which is connected to an input terminal In1, and a transistor 104 the base of which is connected to an input terminal In2.

The anode of the laser diode 101 and the cathode of the photodiode 102 are connected to a direct-current power source Vcc.

The laser diode 101 produces a modulated optical signal. The optical signal produced by the laser diode 101 is output externally via an optical system 105 such as a lens and/or the like as front light. In addition, a portion of the optical signal produced by the laser diode 101 is received by the photodiode 102 as rear light.

The photodiode 102 converts the optical signal received from the laser diode 101 into a current signal and outputs the current signal. The current signal indicates the strength of the rear light.

The collector of the transistor 103 is connected to the anode of the laser diode 101. The collector of the transistor 104 is connected to the cathode of the laser diode 101. The transistors 103 and 104 constitute a differential pair for inputting electrical signals from the input terminals In1 and In2.

The emitters of the transistor 103 and the transistor 104 are connected to a modulated current driving circuit 110.

The modulated current driving circuit 110 comprises a variable current source 111. One of the terminals of the variable current source 111 is connected to the emitters of the transistor 103 and the transistor 104. The other terminal of the variable current source 111 is connected to ground. In order to modulate and drive the laser diode 101, the modulated current driving circuit 110 supplies a modulated current $I_M$ to the laser diode 101 by passing a current through the transistors 103 and 104, setting the extinction ratio of the optical signal produced by the laser diode 101.

The cathode of the laser diode 101 is connected to a bias current driving circuit 120.

The bias current driving circuit 120 comprises a choke coil 121 and a variable current source 122. One terminal of the choke coil 121 is connected to the cathode of the laser diode 101. The other terminal of the choke coil 121 is connected to one terminal of the variable current source 122. The other terminal of the variable current source 122 is connected to ground.

The bias current driving circuit 120 passes a direct-current bias current to the laser diode 101.

The anode of the photodiode 102 is connected to a current-to-voltage conversion circuit 130.

The current-to-voltage conversion circuit 130 comprises a resistor 131 and a variable current source 132. One terminal of the resistor 131 and one terminal of the variable current source 132 are connected together to the anode of the photodiode 102. The other terminal of the resistor 131 and the other terminal of the variable current source 132 are connected to ground. That is to say, the resistor 131 and the variable current source 132 are in parallel.

The current-to-voltage conversion circuit 130 converts the current signal output by the photodiode 102 into a voltage signal.

The optical transmitter 100 further comprises a reference voltage source 141, a comparison amplifier 142, a temperature sensor 143, a bias current regulator 144 and a modulated current regulator 145.

The reference voltage source 141 produces a reference voltage for comparing to the voltage of the voltage signal output by the current-to-voltage conversion circuit 130.

One input terminal of the comparison amplifier 142 is connected to the output terminal of the current-to-voltage conversion circuit 130, and the other input terminal of the comparison amplifier 142 is connected to the reference voltage source 141. The comparison amplifier 142 takes as inputs the voltage signal output by the current-to-voltage conversion circuit 130 and the reference voltage produced by the reference voltage source 141 and compares the voltage signal and the reference voltage. The comparison amplifier 141 provides the comparison results between the voltage signal and the reference voltage to the variable current source 122 in the bias current driving circuit 120 and modulates the current flowing through the variable current source 122.

The temperature sensor 143 detects the internal temperature of the optical transmitter 100 and provides the temperature that is the detected result to the bias current regulator 144 and the modulated current regulator 145.

The bias current regulator 144 regulates the current of the variable current source 132 in the current-to-voltage conversion circuit 130 based on the temperature detected by the temperature sensor 143. That is to say, the bias current regulator 144 regulates the current value of the current flowing from the variable current source 132 so that the strength of the optical signal output by the optical transmitter 100 achieves a desired value for each temperature detected by the temperature sensor 143.

The modulated current regulator 145 regulates the current from the variable current source 111 of the modulated current driving circuit 110 based on the temperature detected by the temperature sensor 143. That is to say, the modulated current regulator 145 regulates the current value of the current flowing from the variable current source 111 so that the strength and extinction ratio of the optical signal output by the optical transmitter 100 respectively achieve desired values for each temperature detected by the temperature sensor 143.

Next, operation of the optical transmitter of FIG. 1 is described.

The temperature sensor 143 detects the internal temperature of the optical transmitter 100 and provides the detection results to the bias current regulator 144 and the modulated current regulator 145.

The bias current modulator 144 regulates the current flowing from the variable current source 132 in the current-to-voltage conversion circuit 130 based on the temperature detected by the temperature sensor 143.

The modulated current regulator 145 regulates the current value of the current flowing from the variable current source 111 of the modulated current driving circuit 110 based on the temperature detected by the temperature sensor 143.

When alternating electrical signals are impressed on the base of the transistor 103 and the base of the transistor 104 via the electrical signal input terminals In1 and In2, the on resistance of the transistor 103 and the transistor 104 change in accordance with the electrical signals. The variable current source 111 passes a current with a current value regulated at that time to the transistor 103 and the transistor 104.

The current flowing from the variable current source 111 is the sum of the current flowing through the transistor 103 and the current flowing through the transistor 104. The difference current between the current flowing through the transistor 103 and the current flowing through the transistor 104 flows to the laser diode 101 as a modulated current $I_M$.

On the other hand, the variable current source 122 passes a direct current of the current value regulated at that time. By the variable current source 122 passing a direct current, a direct-current bias current $I_B$ flows to the laser diode 101.

Accordingly, a current that is the sum of the modulated current $I_M$ and the bias current $I_B$ flows to the laser diode 101 and in accordance therewith the laser diode 101 emits light. The modulated current $I_M$ flowing to the laser diode 101 varies in accordance with the electrical signal, so the laser diode 101 produces an optical signal modulated in accordance with the electrical signal.

The photodiode 102 is optically linked to the laser diode 101, receives the rear light output by the laser diode 101 and outputs a current proportional to the strength of the rear light. In other words, the photodiode 102 converts the optical signal output by the laser diode 101 as rear light into a current signal.

With the current-to-voltage conversion circuit 130, the resistor 131 becomes a pull-down resistor and the variable current source 132 becomes a sink-type current source in parallel with the resistor 131. The resistor 131 and the variable current source 132 split the current signal output by the photodiode 102. The variable current source 132 passes a current with a current value regulated at that point in time. The resistor 131 converts the current flowing through the resistor 131 into a voltage signal and outputs this signal to the comparison amplifier 142. The current flowing through the resistor 131 changes as a result of the current absorbed by the variable current source 132. The voltage signal output by the resistor 131 also changes as a result of the current absorbed by the variable current source 132.

The comparison amplifier 142 compares the voltage of the voltage signal provided from the current-to-voltage conversion circuit 130 and the reference voltage provided from the reference voltage source 141, produces a signal to control the current from the variable current source 122 so that the voltage of the voltage signal becomes equal to the reference voltage, and provides this signal to the variable current source 122. By providing this signal to the variable current source 122, the current value of the bias current $I_B$ is set. The strength of the optical signal produced by the laser diode 101 is set by the current value of the bias current $I_B$, so the strength of the optical signal output by the laser diode 101 approaches a predetermined value. By repeating control that causes the bias current to change based on the signal output by the comparison amplifier 142, the voltage of the voltage signal provided from the current-to-voltage conversion circuit 130 and the reference voltage become equal and the control operation concludes.

That is to say, the photodiode 102, the current-to-voltage conversion circuit 130, the comparison amplifier 142 and the bias current driving circuit 120 become a feedback circuit for the laser diode 101 that outputs the optical signal, so APC is accomplished. By accomplishing APC, the strength of the optical signal output by the optical transmitter 100 converges to a set value.

Here, a method of setting the strength of the optical signal output by the optical transmitter 100 of the first preferred embodiment and the extinction ratio of the optical signal is described.

In general, the efficiency with which the strength of the rear light of the laser diode 101 is converted to a current value by the photodiode 102 varies by a factor of around 10 depending on the photodiode 102 installed in the product. In addition, the relationship between the driving current of the laser diode 101 and the output light of the laser diode 101 varies depending on the individual laser diode 101. Consequently, in order to obtain the desired light-emission strength and extinction ratio as an optical transmitter 100, individual regulation is necessary for each product.

In the optical transmitter 100, when the APC is in a finished state, the voltage signal output by the current-to-voltage conversion circuit 130 and the reference voltage output by the reference voltage source 141 become equal. In this state, a fixed current found by dividing the reference voltage by the resistance value of the resistor 131 is flowing in the resistor 131. A value found by adding the fixed current value flowing through the resistor 131 and the sink current value of the variable current source 132 is the current value flowing through the photodiode 102. In addition, when the APC is in a finished state, the current value flowing through the photodiode 102 and the strength of the rear light of the laser diode 101 have a proportional relationship.

When the sink current value of the variable current source 132 is regulated and caused to change by the bias current regulator 144, the voltage of the voltage signal output by the resistor 131 changes. Because the voltage signal output by the resistor 131 changes, the current value flowing from the variable current source 122 and the bias current $I_B$ change. Because the bias current $I_B$ changes, the light-emission strength of the laser diode 101 changes. The light-emission strength of the laser diode 101 is dependent on the sink current value of the variable current source 132. Accordingly, by setting the sink current value of the variable current source 132 set by the bias current regulator 144 such that the optical signal output by the optical transmitter 100 becomes the desired optical strength, an optical signal of the desired strength is obtained regardless of the properties of the laser diode 101 and the photodiode 102 or variances therein.

On the other hand, by causing the current flowing to the variable current source 111 to change by means of the modulated current regulator 145, the modulated current $I_M$ changes. Because the modulated current $I_M$ changes, the extinction ratio of the optical signal output by the optical transmitter 100 changes. Accordingly, in conjunction with the bias current $I_B$ being caused to change and the strength of the optical signal being set, if the modulated current $I_M$ is regulated by the modulated current regulator 145 so that the extinction ratio of the optical signal output by the optical transmitter 100 becomes the desired value, an optical signal with the desired extinction ratio is obtained.

Next, the efficacy of the optical transmitter 100 according to the first preferred embodiment is described.

(1) In the optical transmitter 100, the current-to-voltage conversion circuit 130 for converting the current signal output by the photodiode 102 to a voltage signal comprises the parallel resistor 131 and variable current source 132, and by determining the bias current $I_B$ by regulating the current (sink current) flowing from the variable current source 132, the strength of the optical signal of the laser diode 101 is determined. That is to say, the resistance value of the resistor 131 is a constant, so as long as the resistance value of the resistor 131 is not a minute value, changes in the optical signal output in response to errors in that resistance value are extremely insensitive. Consequently, even when the strength of the optical signal is adjusted to the desired value, it is possible to prevent the regulatable dynamic range of the optical signal from being limited by variances in the resistance value of the resistor 131.

(2) Because the resistance value of the resistor 131 is a constant value, the loop gain of the APC is fixed, so the APC becoming unstable is not a problem.

(3) The rear light of the laser diode 101 is directly received by the photodiode 102 while the optical signal output by the optical transmitter 100 is output via the optical system 105 such as a lens, but in the optical transmitter 100, the temperature sensor 143 detects the temperature and the bias current $I_B$ and the modulated current $I_M$ are regulated based on the detected temperature. Consequently, it is possible to control tracking errors consisting of the strength of the optical signal output by the optical transmitter 100 fluctuating in accordance with the surrounding temperature even when the strength of the rear light is appropriately controlled.

(4) The optical transmitter 100 accomplishes a feedback-type APC and sets the strength and extinction ratio of the outputted optical signal to desired values, so it is possible to compensate for fluctuations in the strength and extinction ratio of the optical signal arising from deterioration of the laser diode 101 and the photodiode 102 with age.

Second Preferred Embodiment

Figure 2:
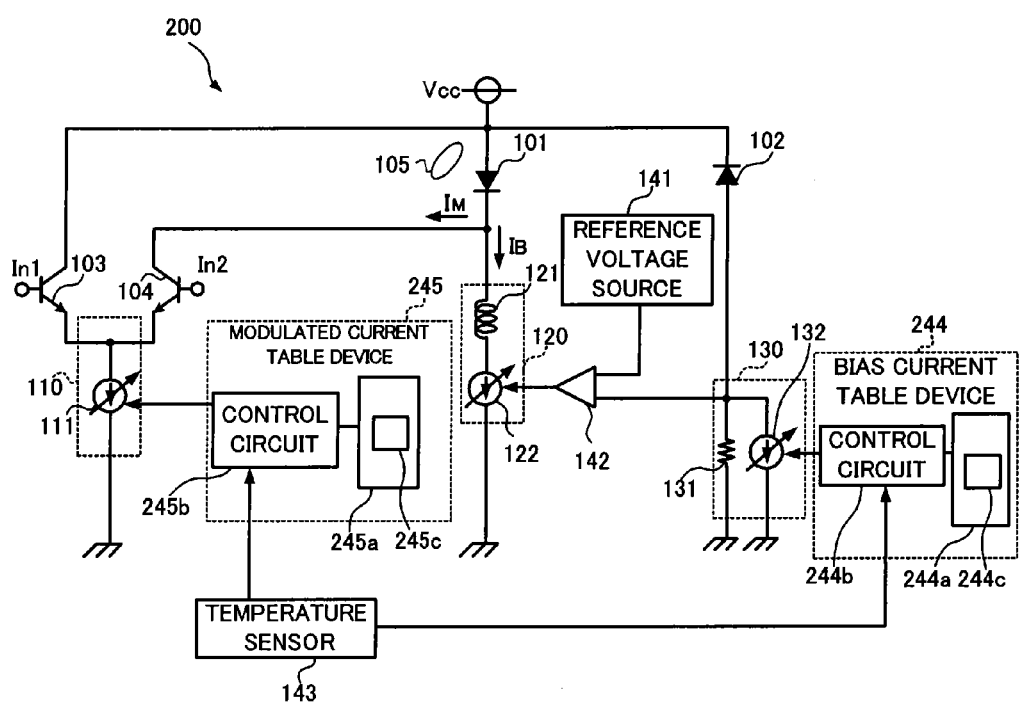
FIG. 2 is a composition diagram showing an optical transmitter according to a second preferred embodiment of the present disclosure.

FIG. 2 is a composition diagram showing an optical transmitter 200 according to a second preferred embodiment of the present disclosure.

In FIG. 2, elements common to FIG. 1 are labeled with common symbols.

This optical transmitter 200 replaces the bias current regulator 144 of the optical transmitter 100 of the first preferred embodiment with a bias current table device 244. The optical transmitter 200 replaces the modulated current regulator 145 of the first preferred embodiment with a modulated current table device 245. The remainder of the composition of the optical transmitter 200 is the same as that of the optical transmitter 100 of the first preferred embodiment.

The bias current table device 244 comprises a memory 244a, and a control circuit 244b connected to the memory 244a. The memory 244a stores the value of the control signal applied to the variable current source 132 in order to cause the bias current $I_B$ to change and the temperature inside the optical transmitter 200, associated with each other, as a temperature compensation table 244c.

The temperature sensor 143 is connected to the control circuit 244b, and the variable current source 132 is connected to the output side of the control circuit 244b. The temperature detected by the temperature sensor 143 is input to the control circuit 244b, and the value of the control signal stored in the memory 244a associated with that temperature is read, converted to an analog control signal and provided to the variable current source 132.

The modulated current table device 245 comprises a memory 245a, and a control circuit 245b connected to the memory 245a. The memory 245a stores values of control signals provided to the variable current source 111 in order to cause the modulated current $I_M$ to change and the temperature inside the optical transmitter 200, associated with each other, as a temperature compensation table 245c.

The temperature sensor 143 is connected to the control circuit 245b, and the variable current source 111 is connected to the output side of the control circuit 245b. The temperature detected by the temperature sensor 143 is input to the control circuit 245b, and the value of the control signal stored in the memory 245a associated with that temperature is read, converted into an analog control signal and provided to the variable current source 111.

The values of the control signal in the tables respectively stored in the memory 244a and 245a are values of the control signal provided to the variable current source 132 and the variable current source 111 so that the strength and extinction ratio of the outputted optical signals become a desired fixed value for each individual optical transmitter 200, stored in advance for each temperature.

Here, the memories 244a and 245a are divided as separate composition elements, but it would be fine for the composition to have a common memory.

Figure 3:
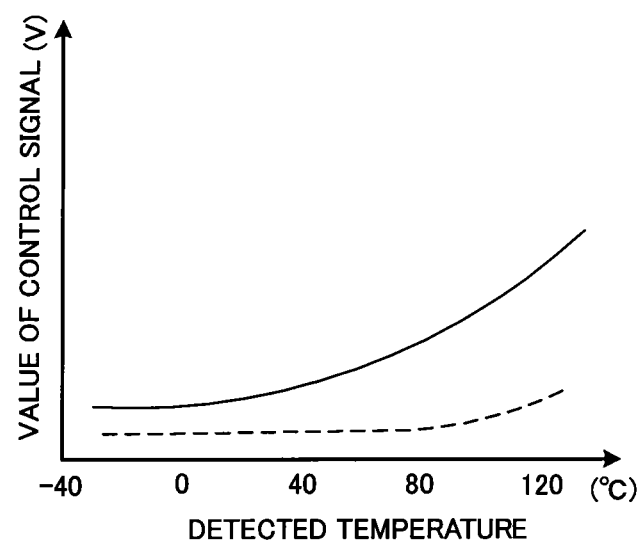
FIG. 3 is a conceptual diagram of a temperature compensation table stored in a memory.

FIG. 3 is a conceptual diagram of the temperature compensation tables 244c and 245c stored in the memories 244a and 245a, with the horizontal axis indicating the temperature (° C.) detected by the temperature sensor 143 and the vertical axis indicating the value (V) of the control signal provided to the variable current source 132 and the variable current source 111. The solid line in FIG. 3 shows the temperature properties of the control signal provided to the variable current source 111, and the dashed line in FIG. 3 shows the temperature properties of the control signal provided to the variable current source 132.

In the optical transmitter 200, the temperature detected by the temperature sensor 143 is provided to the control circuit 244b of the bias current table device 244 and the control circuit 245b of the modulated current table device 245.

The control circuit 244b reads the value of the control signal corresponding to the temperature detected by the temperature sensor 143 from the memory 244a, converts the value to an analog control signal and provides the signal to the variable current source 132. Through this, the current value of the variable current source 132 is regulated.

The control circuit 245b reads the value of the control signal corresponding to the temperature detected by the temperature sensor 143 from the memory 245a, converts the value to an analog control signal and provides the signal to the variable current source 111. Through this, the current value of the variable current source 111 is regulated.

The modulated current driving circuit 110, the bias current driving circuit 120, the current-to-voltage conversion circuit 130, the reference voltage source 141 and the comparison amplifier 142 accomplish APC the same as in the first preferred embodiment on the transistors 103 and 104, the laser diode 101 and the photodiode 102, and an optical signal having the desired strength and extinction ratio is output from the laser diode 101 via the optical system 105.

The optical transmitter 200 of the second preferred embodiment produces the same efficacy as the optical transmitter 100 of the first preferred embodiment and also produces the following efficacy. Here, the efficacy of the optical transmitter 200 is explained.

In order to control the strength and extinction ratio of the optical signal output from the optical transmitter to be a constant, temperature compensation of the bias current $I_B$ and the modulated current $I_M$ is necessary. As a means of accomplishing temperature compensation of the bias current $I_B$ and the modulated current $I_M$, an electrical circuit method that applies a thermistor and/or the like for changing the resistance value depending on the temperature is conceivable. However, the temperature-dependent properties of the strength of the optical signal with respect to the driving current of individual laser diodes 101 and the temperature-dependent properties of tracking errors of each individual optical transmitter 200 are diverse, so temperature compensation is not necessarily accomplished with an electrical circuit method.

With the optical transmitter 200, the values of control signals provided to the variable current source 132 and the variable current source 111 so as to obtain a constant strength and extinction ratio of the optical signal for each temperature are stored in advance for each temperature, for each individual optical transmitter 200. Consequently, it is possible to obtain a constant optical output strength and extinction ratio for each temperature, for any device. Accordingly, it is possible to obtain an optical transmitter capable of controlling fluctuations in optical signal strength due to tracking errors produced by a typical feedback-type APC.

Third Preferred Embodiment

Figure 4:
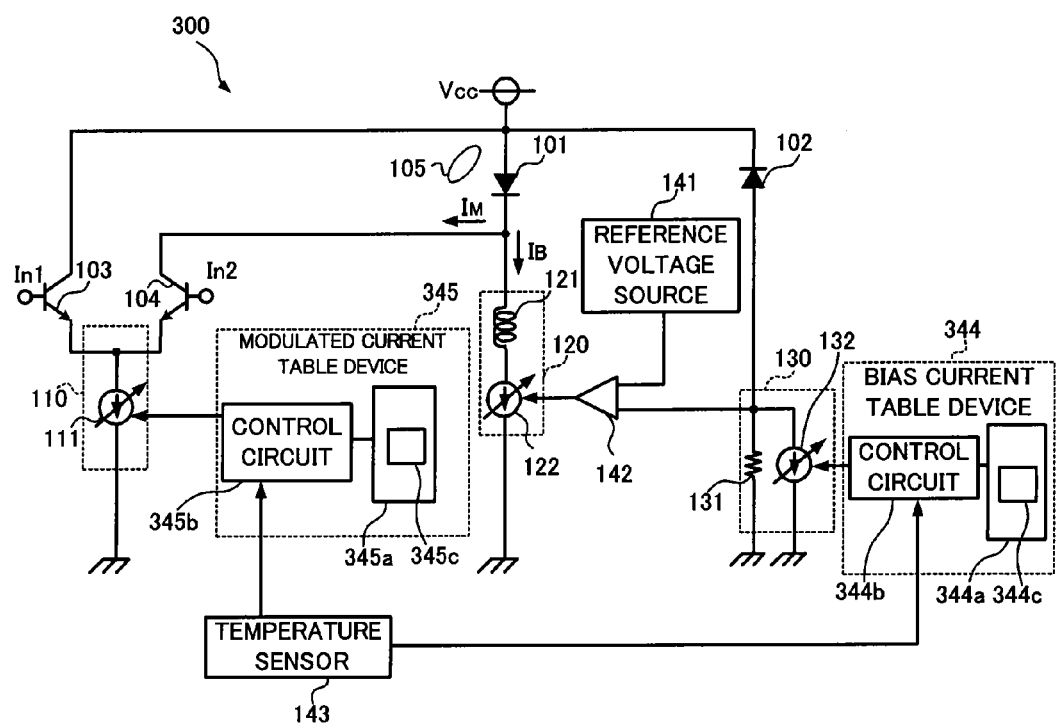
FIG. 4 is a composition diagram showing an optical transmitter according to a third preferred embodiment of the present disclosure.

FIG. 4 is a composition diagram showing an optical transmitter 300 according to a third preferred embodiment of the present disclosure.

In FIG. 4, elements common to FIG. 1 are labeled with common symbols.

The optical transmitter 300 replaces the bias current regulator 144 of the optical transmitter 100 of the first preferred embodiment with a bias current table device 344. The optical transmitter 300 replaces the modulated current regulator 145 of the first preferred embodiment with a modulated current table device 345. The remainder of the composition of the optical transmitter 300 is the same as that of the optical transmitter 100 of the first preferred embodiment.

The bias current table device 344 comprises a memory 344a and a control circuit 344b connected to the memory 344a. The memory 344a stores values of control signals provided to the variable current source 132 for changing the bias current $I_B$ and temperatures inside the optical transmitter 300, associated with each other, as a temperature compensation table 344c.

The temperature sensor 143 is connected to the control circuit 344b and the variable current source 132 is connected to the output side of the control circuit 344b. The temperature detected by the temperature sensor 143 is input to the control circuit 344b, which reads the value of the control signal stored in the memory 344a associated with that temperature, converts this value into an analog control signal and provides the signal to the variable current source 132.

The modulated current table device 345 comprises a memory 345a and a control circuit 345b connected to the memory 345a. The memory 345a stores values of control signals provided to the variable current source 111 in order to change the modulated current $I_M$ and temperatures inside the optical transmitter 300, associated with each other, as a temperature compensation table 302.

The temperature sensor 143 is connected to the control circuit 345b and the output side of the control circuit 345b is connected to the variable current source 111. The temperature detected by the temperature sensor 143 is input to the control circuit 345b, which reads the value of the control signal stored in the memory 345a associated with that temperature, converts this value to an analog control signal and provides the signal to the variable current source 111.

The values of control signals in the tables respectively stored in the memories 344a and 345a are values of control signals provided to the variable current source 132 and the variable current source 111 so that the strength and extinction ratio of the outputted optical signals become desired constant values and are stored in advance for each temperature, for each individual optical transmitter 300.

Here, the memory 344a and 345a are divided as separate composition elements, but it would be fine for these to constitute a common memory.

In this optical transmitter 300, the temperature detected by the temperature sensor 143 is provided to the control circuit 344b of the bias current table device 344 and the control circuit 345b of the modulated current table device 345.

In this optical transmitter 300, the bias current table 344 and the modulated current table device 345 operate the same as the bias current table device 244 and the modulated current table device 245 of the second preferred embodiment.

That is to say, the control circuit 344b reads the value of the control signal corresponding to the temperature detected by the temperature sensor 143 from the memory 344a, converts the value to an analog control signal and provides the signal to the variable current source 132. Through this, the current value of the variable current source 132 is regulated.

The control circuit 345b reads the value of the control signal corresponding to the temperature detected by the temperature sensor 143 from the memory 345a, converts the value to an analog control signal and provides the signal to the variable current source 111. Through this, the current value from the variable current source 111 is regulated.

The modulated current driving circuit 110, the bias current driving circuit 120, the current-to-voltage conversion circuit 130, the reference voltage source 141 and the comparison amplifier 142 accomplish APC the same as in the first preferred embodiment on the transistors 103 and 104, the laser diode 101 and the photodiode 102, and an optical signal having the desired strength and extinction ratio is output from the laser diode 101 via the optical system 105.

Next, a method of creating the temperature compensation tables stored in the memories 344a and 345a is described.

Figure 5:
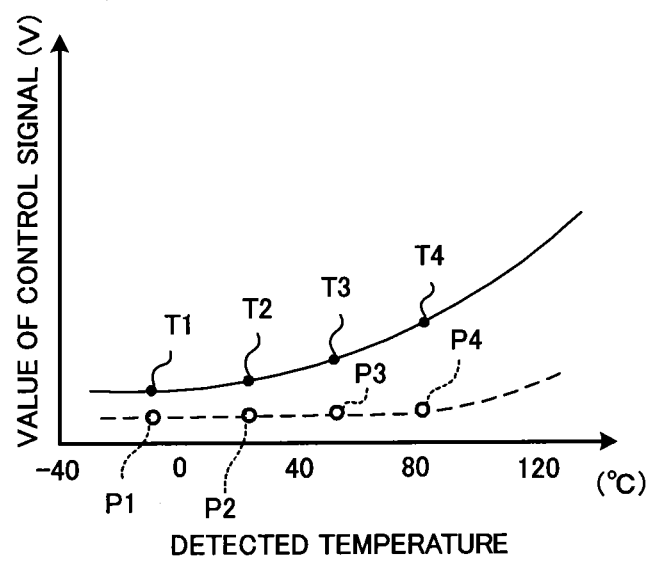
FIG. 5 is a conceptual diagram of a temperature compensation table stored in a memory.

FIG. 5 is a conceptual diagram of temperature compensation tables 344c and 345c stored in the memories 344a and 345a, with the horizontal axis indicating the temperature (° C.) detected by the temperature sensor 143 and the vertical axis indicating the value (V) of the control signal provided to the variable current source 132 and the variable current source 111. The solid line in FIG. 5 shows the temperature properties of the control signal provided to the variable current source 111, and the dashed line in FIG. 5 shows the temperature properties of the control signal provided to the variable current source 132.

When creating the temperature compensation tables, an arbitrary number of temperatures are selected from the temperature range assumed as the environment temperature of the optical transmitter 300. FIG. 5 shows a case in which four temperatures were selected. The modulated current $I_M$ and the bias current $I_B$ are regulated so that the desired constant optical output strength and extinction ratio are obtained for each temperature selected. Furthermore, values T1, T2, T3 and T4 of the control signal provided to the variable current source 111 when the desired constant optical output strength and extinction ratio are obtained are stored in the memory 345a, associated with each temperature. In addition, values P1, P2, P3 and P4 of the control signal provided to the variable current source 132 when the desired constant optical output strength and extinction ratio are obtained are stored in the memory 344a, associated with each temperature.

Next, interpolation complementation and extrapolation complementation are accomplished over all of the necessary temperature range based on the values T1, T2, T3 and T4 of the control signal provided to the variable current source 111 for the above-described four temperatures, the values of the control signal provided to the variable current source 111 are found, and these values are stored in the memory 345a associated with the temperature.

Similarly, interpolation complementation and extrapolation complementation are accomplished over all of the necessary temperature range based on the values P1, P2, P3 and P4 of the control signal provided to the variable current source 132 for the above-described four temperatures, the values of the control signal provided to the variable current source 132 are found, and these values are stored in the memory 344a associated with the temperature.

In this manner, the values of the control signal for each temperature stored in the memory 344a and 345a become the temperature compensation tables 344c and 345c.

As described above, with the optical transmitter 300 of the third preferred embodiment, temperature compensation tables for the complete temperature range necessary are created through interpolation complementation and extrapolation complementation. Accordingly, it is possible to greatly shorten the creation time of the temperature compensation tables.

Fourth Preferred Embodiment

Figure 6:
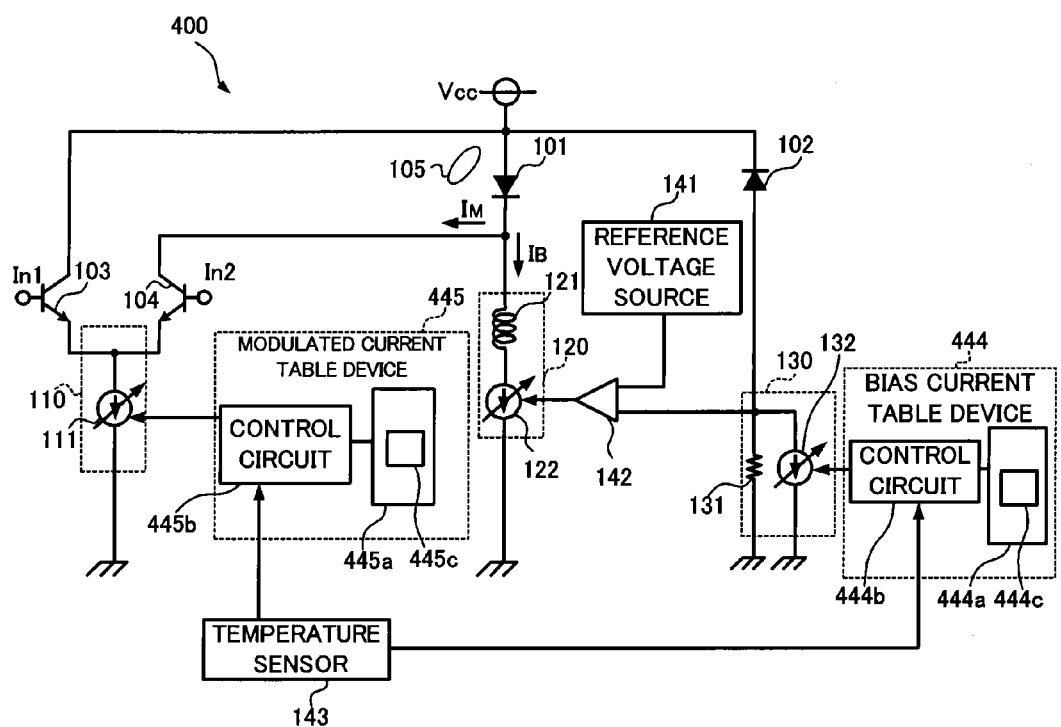
FIG. 6 is a composition diagram showing an optical transmitter according to a fourth preferred embodiment of the present disclosure.

FIG. 6 is a composition diagram showing an optical transmitter 400 according to a fourth preferred embodiment of the present disclosure.

In FIG. 6, elements common to FIG. 1 are labeled with common symbols.

The optical transmitter 400 replaces the bias current regulator 144 of the optical transmitter 100 of the first preferred embodiment with a bias current table device 444. The optical transmitter 400 replaces the modulated current regulator 145 of the first preferred embodiment with a modulated current table device 445. The remainder of the composition of the optical transmitter 400 is the same as that of the optical transmitter 100 of the first preferred embodiment.

The bias current table device 444 comprises a memory 444a and a control circuit 444b connected to the memory 444a. The memory 444a stores values of control signals provided to the variable current source 132 for changing the bias current $I_B$ and temperatures inside the optical transmitter 400, associated with each other, as a temperature compensation table 444c.

The temperature sensor 143 is connected to the control circuit 444b and the variable current source 132 is connected to the output side of the control circuit 444b. The temperature detected by the temperature sensor 143 is input to the control circuit 444b, which reads the value of the control signal stored in the memory 444a associated with that temperature, converts this value into an analog control signal and provides the signal to the variable current source 132.

The modulated current table device 445 comprises a memory 445a and a control circuit 445b connected to the memory 445a. The memory 445a stores values of control signals provided to the variable current source 111 in order to change the modulated current $I_M$ and temperatures inside the optical transmitter 400, associated with each other, as a temperature compensation table 402.

The temperature sensor 143 is connected to the control circuit 445b and the output side of the control circuit 445b is connected to the variable current source 111. The temperature detected by the temperature sensor 143 is input to the control circuit 445b, which reads the value of the control signal stored in the memory 445a associated with that temperature, converts this value to an analog control signal and provides the signal to the variable current source 111.

The values of control signals in the tables respectively stored in the memories 444a and 445a are values of control signals provided to the variable current source 132 and the variable current source 111 so that the strength and extinction ratio of the outputted optical signals become desired constant values and are stored in advance for each temperature, for each individual optical transmitter 400.

Here, the memory 444a and 445a are divided as separate constituent elements, but it would be fine for these to constitute a common memory.

In this optical transmitter 400, the temperature detected by the temperature sensor 143 is provided to the control circuit 444b of the bias current table device 444 and the control circuit 445b of the modulated current table device 445.

In this optical transmitter 300, the bias current able 444 and the modulated current table device 445 operate the same as the bias current table device 244 and the modulated current table device 245 of the second preferred embodiment.

That is to say, the control circuit 444b reads the value of the control signal corresponding to the temperature detected by the temperature sensor 143 from the memory 444a, converts the value to an analog control signal and provides the signal to the variable current source 132. Through this, the current value from the variable current source 132 is regulated.

The control circuit 445b reads the value of the control signal corresponding to the temperature detected by the temperature sensor 143 from the memory 445a, converts the value to an analog control signal and provides the signal to the variable current source 111. Through this, the current value from the variable current source 111 is regulated.

The modulated current driving circuit 110, the bias current driving circuit 120, the current-to-voltage conversion circuit 130, the reference voltage source 141 and the comparison amplifier 142 accomplish APC the same as in the first preferred embodiment on the transistors 103 and 104, the laser diode 101 and the photodiode 102, and an optical signal having the desired strength and extinction ratio is output from the laser diode 101 via the optical system 105.

Next, a method of creating the temperature compensation tables stored in the memories 444a and 445a is described.

Figure 7:
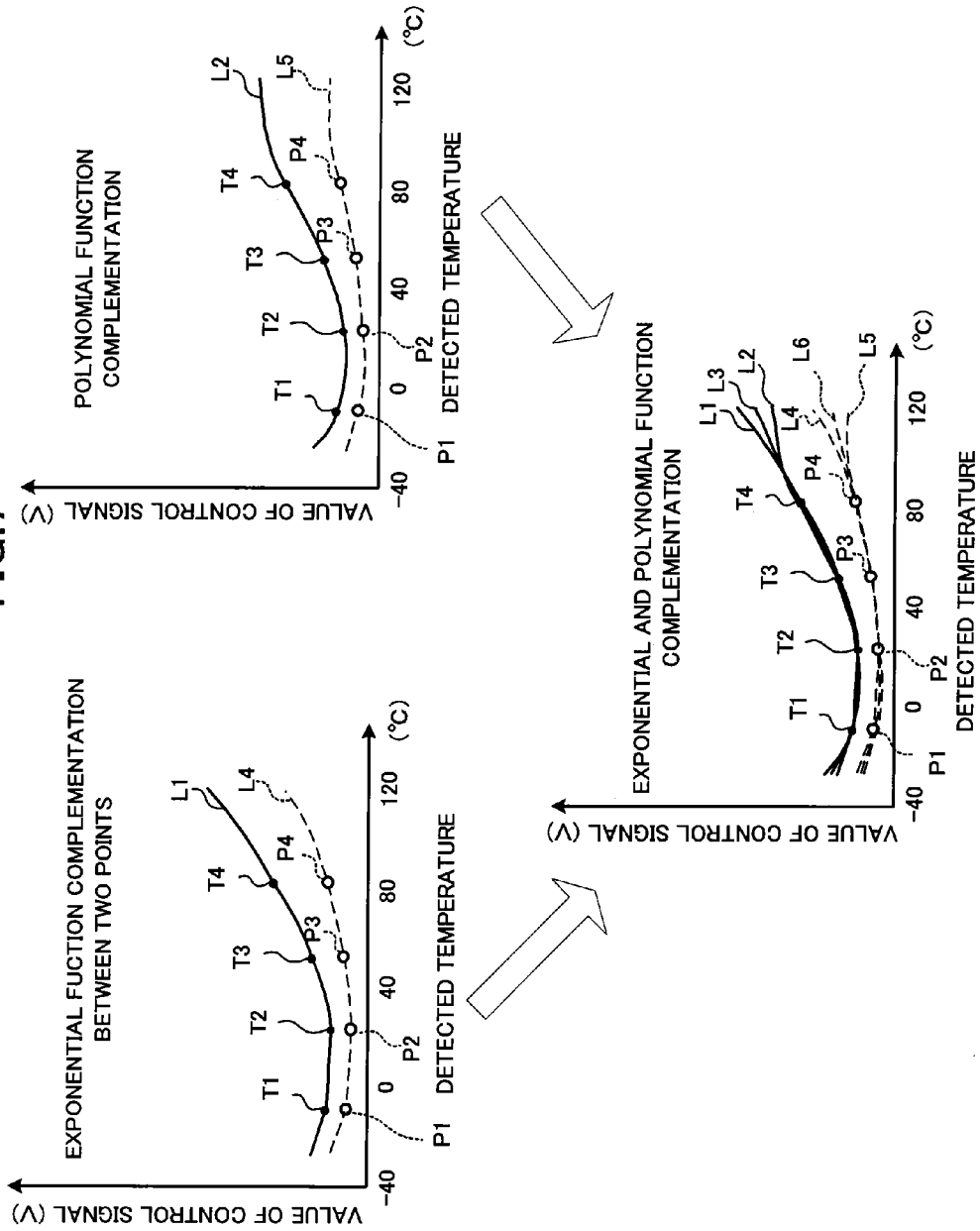
FIG. 7 is a conceptual diagram for explaining a method of creating a temperature compensation table stored in a memory.

FIG. 7 is a conceptual diagram used to described the method of creating the temperature compensation tables 444c and 445c stored in the memories 444a and 445a.

When creating the temperature compensation tables, an arbitrary number of temperatures are selected from the temperature range assumed as the environment temperature of the optical transmitter 400. FIG. 7 shows a case in which four temperatures were selected. The modulated current $I_M$ and the bias current $I_B$ are regulated so that the desired constant optical output strength and extinction ratio are obtained for each temperature selected. Furthermore, values T1, T2, T3 and T4 of the control signal provided to the variable current source 111 when the desired constant optical output strength and extinction ratio are obtained are stored in the memory 445a, associated with each temperature. In addition, values P1, P2, P3 and P4 of the control signal provided to the variable current source 132 when the desired constant optical output strength and extinction ratio are obtained are stored in the memory 444a, associated with each temperature.

Next, interpolation complementation and extrapolation complementation are accomplished using exponential complementation between two neighboring points over all of the necessary temperature range based on the values T1, T2, T3 and T4 of the control signal provided to the variable current source 111 for the above-described four temperatures, and a value L1 of the control signal provided to the variable current source 111 is found. Furthermore, polynomial complementation for example across four points is accomplished based on the values T1, T2, T3 and T4 of the control signal, and a value L2 of the control signal provided to the variable current source 111 over the entire temperature range is found. In addition, an average L3 of the value of the control signal obtained by exponential complementation and the value of the control signal obtained by polynomial complementation is found for each temperature and is stored in the memory 445a.

Similarly, interpolation complementation and extrapolation complementation are accomplished using exponential complementation between two neighboring points over all of the necessary temperature range based on the values P1, P2, P3 and P4 of the control signal provided to the variable current source 132 for the above-described four temperatures, and a value L4 of the control signal provided to the variable current source 132 is found. Furthermore, polynomial complementation for example across four points is accomplished based on the values P1, P2, P3 and P4 of the control signal, and a value L5 of the control signal provided to the variable current source 132 over the entire temperature range is found. In addition, an average L6 of the value of the control signal obtained by exponential complementation and the value of the control signal obtained by polynomial complementation is found for each temperature and is stored in the memory 444a.

In this manner, the values of the control signal for each temperature stored in the memory 444a and 445a become the temperature compensation tables 444c and 445c.

As described above, with the optical transmitter 400 of the fourth preferred embodiment, temperature compensation tables for the complete temperature range necessary are created by accomplishing exponential complementation between two points and polynomial complementation across four points and by finding the average thereof. The efficacy of creating temperature compensation tables with this method will now be described.

In general, the temperature dependence of the strength of the optical signal with respect to the driving current of the laser diode 101 can be roughly approximated through an exponential function, but in the optical transmitter, it is necessary to take into consideration the temperature dependence of tracking errors in addition to the temperature dependence of the laser diode 101. The temperature dependence of tracking errors is in general small at normal temperatures and tends to become larger at low temperatures and high temperatures, so approximation with an exponential function is impossible.

In the optical transmitter 400 of the fourth preferred embodiment, the results of complementation through an exponential function between two neighboring points and the results of polynomial complementation across four points are combined (averaged). Through this, the temperature dependence of the strength of an optical signal containing a tracking error can be suppressed with high precision. Accordingly, the optical transmitter 400 achieves the efficacy of being able to suppress tracking errors, in addition to the efficacy of the first preferred embodiment.

The present disclosure is not limited to the above-described preferred embodiments, for various variations are possible.

For example, in the first and fourth preferred embodiments, values of the control signals of the variable current sources 132 and 111 are found for four temperatures and values of the control signal over the entire temperature range are found using the values of the control signal at the four temperatures as reference points, but the invention is not limited to four temperatures, and it would be fine to use five or more temperatures, or to use three or fewer temperatures.

In addition, in the first through fourth preferred embodiments, the bias current and modulated current are regulated so that the strength and extinction ratio of the optical signal output via the optical system 105 become desired values in order to prevent tracking errors, but it would be fine to give no consideration to tracking errors, and it would be fine for the strength and extinction ratio of the rear light to be regulated so as to achieve desired values.

In addition, in the fourth preferred embodiment, an example was shown in which temperature compensation tables are created using exponential complementation and polynomial complementation, but the functions used in complementation are not limited to exponential complementation and polynomial complementation, and other functions may be used.

In addition, in the fourth preferred embodiment, complementary results of two types of complementation were combined by taking the simple average of the value of the control signal obtained by exponential complementation and the value of the control signal obtained by polynomial complementation, but this is intended to be illustrative and not limiting. For example complementary results of two types of complementation may be combined by finding a weighted average.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

INDUSTRIAL APPLICABILITY

The present disclosure is applicable to ensuring wide dynamic range of an outputted optical signal.

REFERENCE SIGNS LIST 100, 200, 300, 400 Optical transmitter
101 Laser diode
102 Photodiode
103, 104 Transistor
105 Optical system
110 Modulated current driving circuit
111, 122, 132 Variable current source
120 Bias current driving circuit
130 Current-to-voltage conversion circuit
131 Resistor
141 Reference voltage source
142 Comparison amplifier
143 Temperature sensor 144 Bias current regulator
145 Modulated current regulator

The invention claimed is:

1. An optical transmitter for outputting an optical signal, the optical transmitter comprising:
   a light-emitting element that is driven and produces the optical signal;
   a light-receiving element that receives the optical signal and outputs a current signal indicating the strength of the optical signal received;
   a current-to-voltage conversion circuit that converts the current signal output by the light-receiving element to a voltage signal, the current-to-voltage conversion circuit including a resistor connected to the light-receiving element and a variable current source connected in parallel with the resistor, and the voltage signal being output from one end of the resistor;
   a comparator that compares a reference voltage and the voltage signal output by the current-to-voltage conversion circuit and outputs a comparison result from comparing the reference voltage and the voltage signal;
   a bias current driving circuit that passes a direct current corresponding to the comparison result from the comparator to the light-emitting element to drive the light-emitting element;
   a modulated current driving circuit that controls a modulated current to have an amplitude that changes in accordance with an input signal to the light-emitting element to modulate the strength of the optical signal;
   a temperature sensor that detects a temperature inside the optical transmitter; and
   a regulator that regulates an amplitude of the modulated current and a value of the current flowing to the variable current source based on the temperature detected by the temperature sensor.

2. The optical transmitter according to claim 1, further comprising an optical system that conveys the optical signal produced by the light-emitting element;
   wherein the light-receiving element receives a portion of the optical signal produced by the light-emitting element not via the optical system.

3. The optical transmitter according to claim 1, wherein the regulator regulates the amplitude of the modulated current and the value of the current flowing to the variable current source so that the strength and extinction ratio of the optical signal produced by the light-emitting element become desired values.

4. The optical transmitter according to claim 2, wherein the regulator regulates the amplitude of the modulated current and the value of the current flowing to the variable current source so that the strength and extinction ratio of the optical signal output via the optical system become desired values.

5. The optical transmitter according to claim 1, wherein:
   the regulator regulates the amplitude of the modulated current and the value of the current flowing to the variable current source by control values the regulator provides to the current-to-voltage conversion circuit and the modulated current driving circuit; and
   the regulator determines the control values such that the strength and the extinction ratio of the optical signal produced by the light-emitting element become desired values for multiple temperatures, and the regulator determines the control values for temperatures other than the multiple temperatures through extrapolation and interpolation using the control values determined for the multiple temperatures.

6. The optical transmitter according to claim 5, wherein the interpolation and extrapolation are accomplished through complementation combining exponential complementation and polynomial complementation.

* * * * *